US012688149B2

(12) United States Patent
Runzo et al.

(10) Patent No.: US 12,688,149 B2
(45) Date of Patent: Jul. 21, 2026

(54) SYSTEM AND METHOD FOR REMEDIATING INACCESSIBLE FILES

(71) Applicant: Equisolve, Inc., Palm City, FL (US)

(72) Inventors: Thomas Runzo, Palm City, FL (US); Eric Mason, Palm City, FL (US)

(73) Assignee: Equisolve, Inc., Palm City, FL (US)

( * ) Notice: Subject to any disclaimer, the term of this patent is extended or adjusted under 35 U.S.C. 154(b) by 0 days.

(21) Appl. No.: 18/806,493

(22) Filed: Aug. 15, 2024

(65) Prior Publication Data

US 2024/0411721 A1     Dec. 12, 2024

Related U.S. Application Data

(63) Continuation-in-part of application No. 18/068,483, filed on Dec. 19, 2022, now Pat. No. 12,169,684, which is a continuation-in-part of application No. 17/685,693, filed on Mar. 3, 2022, now abandoned, which is a continuation-in-part of application No. 17/675,735, filed on Feb. 18, 2022, now Pat. No. 12,174,983.

(51) Int. Cl.
*G06F 16/00* (2019.01)
*G06F 16/11* (2019.01)
*G06F 16/84* (2019.01)

(52) U.S. Cl.
CPC ............ *G06F 16/116* (2019.01); *G06F 16/84* (2019.01)

(58) Field of Classification Search
None
See application file for complete search history.

(56) References Cited

U.S. PATENT DOCUMENTS

2010/0250497 A1 * 9/2010 Redlich ................. G06Q 10/06
                                                                707/661
2022/0066600 A1 * 3/2022 Walsh ................... G06F 16/951

FOREIGN PATENT DOCUMENTS

CA          2627092 A1 * 4/2007 ......... H04L 63/0428

* cited by examiner

*Primary Examiner* — Tuankhanh D Phan
(74) *Attorney, Agent, or Firm* — Mark Terry

(57) ABSTRACT

A system for remediating accessible files includes a computing device for receiving from an entity a plurality of files associated with a particular document type for a particular company, identifying and selecting a set of XML-based files within the plurality of files, wherein said set of XML-based files includes inaccessible code or content that is not accessible to persons with disabilities that use assistive technologies, reading metadata of the set of XML-based files and identifying a document type in said metadata, selecting a matching XML template from a plurality of XML templates, wherein said matching XML template corresponds to the document type, generating and storing a plurality of accessible files constructed from a combination of the set of XML-based files and the particular XML template, and transmitting the plurality of accessible files over the communications network to another computing device for publication.

11 Claims, 7 Drawing Sheets

300

| Inaccessible files generated 304 | → | Inaccessible files read by system 308 | → | Inaccessible files remediated 316 | → | Accessible files transmitted 318 | → | Accessible files published 320 | → | Consumer views accessible files 322 |

Execute accessibility testing tool
376

Open GUI to edit file
377

Edit files
378

Edited files transmitted
379

375

SYSTEM AND METHOD FOR REMEDIATING INACCESSIBLE FILES

CROSS-REFERENCE TO RELATED APPLICATIONS

This patent application is a continuation in part of, and claims priority to, patent application Ser. No. 18/068,483 filed Dec. 19, 2022, and titled "system and method for providing accessibility of files over a communications network" which is a continuation in part of, and claims priority to, patent application Ser. No. 17/685,693 filed Mar. 3, 2022, and titled "system and method for providing accessibility of financial documents" which is a continuation in part of, and claims priority to, patent application Ser. No. 17/675,735 filed Feb. 18, 2022, and titled "system and method for managing material non-public information for financial industry." The subject matter of patent application Ser. Nos. 18/068,483, 17/685,693 and 17/675,735 are hereby incorporated by reference in their entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The claimed subject matter relates to the field of accessibility technology and, more specifically, the claimed subject matter relates to the field of providing files that are accessible to the disabled or those using assistive technology.

BACKGROUND

The Securities and Exchange Commission (SEC) requires public companies, certain company insiders, and broker-dealers to file periodic financial statements and other disclosures, which are often referred to as SEC filings, SEC filing documents, or regulatory files. Finance professionals and investors rely on SEC filings to make informed decisions when evaluating whether to invest in a company. SEC filings can be accessed for free on the SEC's website and the company's website, referred to as its Electronic Data Gathering, Analysis, and Retrieval system, otherwise known as EDGAR. The SEC selectively reviews the information it receives to monitor and enhance compliance. Investors study SEC filings to form a view of a company's performance and activities. Similarly, newswires and news aggregators are organizations that gather news reports and press releases and distributes them. Investors also study press releases to form a view of a company's performance and activities.

For the majority of consumers and investors, maneuvering through EDGAR and reading SEC filings and press releases is a relatively easy task. But for the 3 out of every 100 individuals that due to low vision, blindness, physical and cognitive disabilities, need to use screen readers and assistive technology, tasks like these can be problematic. One solution to this problem is the provision of accessible files. An accessible file is created to be as easily readable by a sighted reader as a low vision, non-sighted reader, or those who require assistive technology. Making files accessible allows individuals with low vision, blindness and disabilities to maneuver through, read and understand documents, and therefore have equal access to information that others take for granted.

One of the drawbacks associated with EDGAR and newswires or news aggregators, however, is that they do not do an adequate job of providing accessible files. This is disadvantageous to the disabled or those using assistive technology as it does not provide them with equal access to the same information that is accessible to those without disabilities. The lack of accessible files in the financial, regulatory of communications sector further disenfranchises a large segment of the population from participating in investment activities, which has long-ranging implications.

Therefore, what is needed is a system and method for improving the problems with the prior art, and more particularly for a more expedient and efficient method and system for facilitating the provision of accessible files to the disabled or those using assistive technology.

BRIEF SUMMARY

In one embodiment, a system and method for remediating inaccessible files is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In another embodiment, a system for remediating accessible files is disclosed. The system includes a computing device communicably connected to a communications network, the computing device configured for receiving from an entity a plurality of files associated with a particular document type for a particular company, identifying and selecting a set of XML-based files within the plurality of files, wherein the files within said set of XML-based files includes inaccessible code or content that is not accessible to persons with disabilities that use assistive technologies, reading metadata of the set of XML-based files and identifying a document type in said metadata, selecting a matching XML template from a plurality of XML templates, wherein said matching XML template corresponds to the document type, generating and storing a plurality of accessible files constructed from a combination of the set of XML-based files and the particular XML template, and transmitting the plurality of accessible files over the communications network to another computing device for publication.

Additional aspects of the claimed subject matter will be set forth in part in the description which follows, and in part will be obvious from the description, or may be learned by practice of the claimed subject matter. The aspects of the claimed subject matter will be realized and attained by means of the elements and combinations particularly pointed out in the appended claims. It is to be understood that both the foregoing general description and the following detailed description are exemplary and explanatory only and are not restrictive of the disclosed subject matter, as claimed.

BRIEF DESCRIPTION OF THE SEVERAL VIEWS OF THE DRAWINGS

The accompanying drawings, which are incorporated in and constitute part of this specification, illustrate embodiments of the claimed subject matter and together with the description, serve to explain the principles of the claimed subject matter. The embodiments illustrated herein are presently preferred, it being understood, however, that the claimed subject matter is not limited to the precise arrangements and instrumentalities shown, wherein:

DETAILED DESCRIPTION

Figure 1:
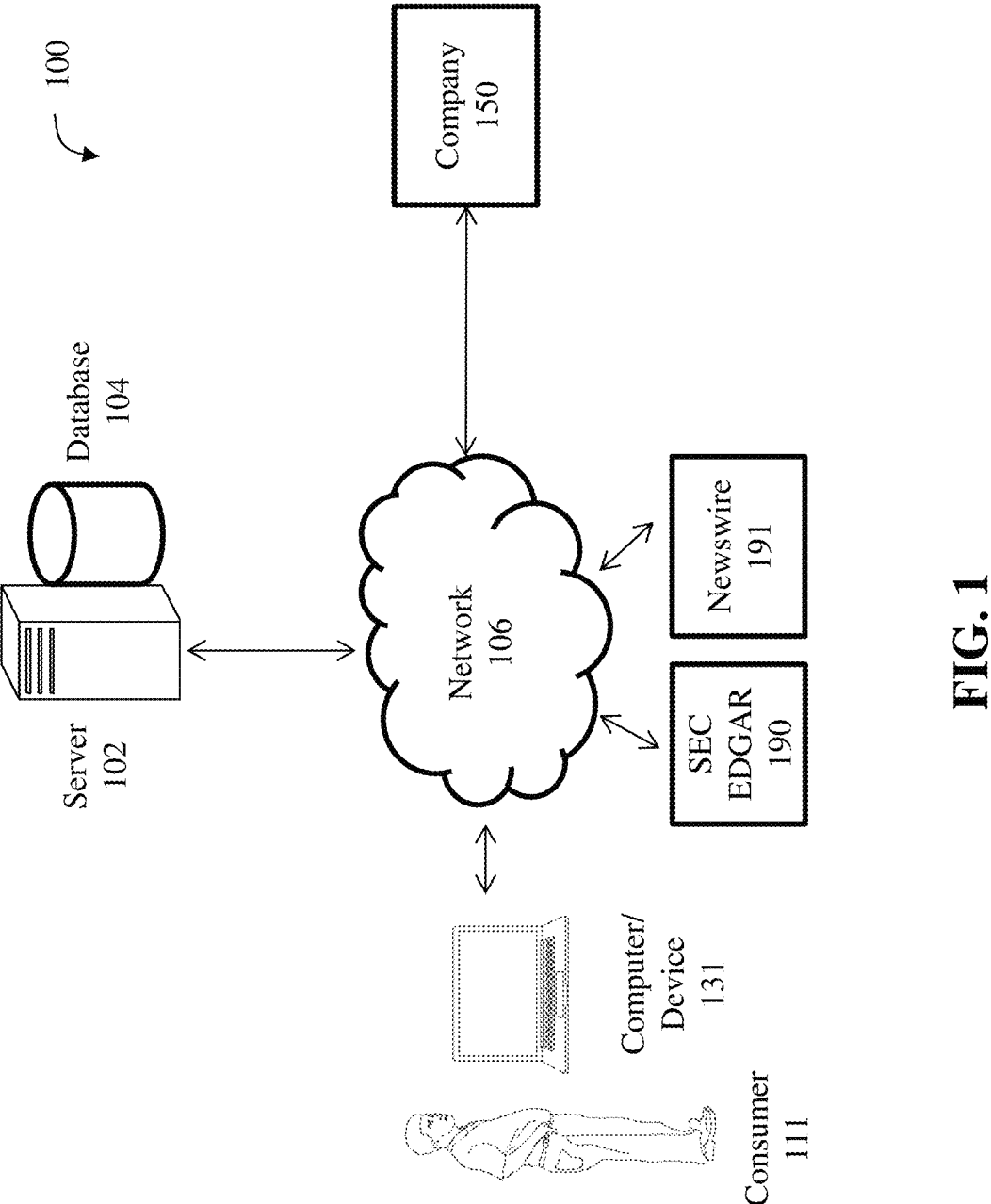
FIG. 1 is a block diagram illustrating the network architecture of a system for remediating inaccessible files, in accordance with one embodiment.

While the claimed embodiments may be described, modifications, adaptations, and other implementations are possible. For example, substitutions, additions, or modifications may be made to the elements illustrated in the drawings, and the compositions and methods described herein may be modified by substituting, reordering, or adding elements to the disclosed compositions or stages to the disclosed methods. Accordingly, the following detailed description does not limit the claimed embodiments. Instead, the proper scope of the claimed embodiments is defined by the appended claims.

The claimed embodiments improve over the prior art by providing an automated process for remediating files of all types while providing the simultaneous distribution (and/or in real time) of financial information (among other types of information) to the general public, including the disabled or those using assistive technology. The claimed embodiments are configured for the automatic detection of inaccessible files or inaccessible portions of files, and the automatic generation of accessible files that correspond to said inaccessible files or inaccessible portions of files. Therefore, the disclosed embodiments reduce or eliminate instances where disabled users or those using assistive technology are not able to view important financial, regulatory, and/or communication files and/or code necessary to make financial decisions. This is advantageous for disabled users or those using assistive technology, as it provides greater access to trading markets and financial activities. An additional benefit of the disclosed embodiments is the automatic and immediate publication of accessible files at the same time (and/or in real time) as the Securities and Exchange Commission (SEC) filing or a press release is made public, which reduces the need for human interaction in the publication process. The main benefit of the claimed subject matter is the improvement of the conventional process of publishing financial information, to the advantage of the disabled or those using assistive technology. The claimed subject matter further allows for the automation of the process of producing accessible versions of inaccessible files, thereby resulting in a savings in time and labor.

Referring now to the drawing figures in which like reference designators refer to like elements, there is shown in FIG. 1 an illustration of a block diagram showing the network architecture of a system 100 and method for facilitating the remediation of inaccessible files in accordance with one embodiment. A prominent element of FIG. 1 is the server 102 associated with repository or database 104 and further communicatively coupled with network 106, which can be a circuit-switched network, such as the Public Service Telephone Network (PSTN), or a packet-switched network, such as the Internet or the World Wide Web, the global telephone network, a cellular network, a mobile communications network, or any combination of the above. Server 102 is a central controller or operator for the functionality of the disclosed embodiments, namely, facilitating the provision of accessible files between users.

An inaccessible document refers to a document or piece of content that cannot be easily accessed or understood by certain individuals, typically due to barriers related to disabilities or other limitations. An accessible document is one that can be consumed by anyone, including those with disabilities of any kind, including cognitive and visual impairments. Remediation is the process of fixing accessibility errors. This ensures that all users, including those with impairments, can interact with and navigate content. This includes document tagging for assistive technologies such as screen readers, or making visual changes on the documents, like color contrast. According to the SEC, internal and external company documents are mandated to be accessible, from policies and procedures to downloadable website content, including, as-filed SEC financial content, compliance reports, shareholder reports, and more.

Using a PDF document as an example, a PDF document must be properly tagged with PDF tags, which identify content such as headings, lists, tables, etc., as well as alternate text for images. Without tags, the document may not be accessible. Alternative text (alt text) is descriptive text which conveys the meaning and context of a visual item, such as a photograph.

FIG. 1 includes computing devices 102, 131, 150, 190, 191 which may be mobile computing devices such as smartphones, mobile phones, tablet computers, handheld computers, laptops, or the like. In another embodiment, computing devices 102, 131, 150, 190, 191 may be stationary devices such as workstations, desktop computers, servers, laptops, all-in-one computers, or the like. In another embodiment, computing devices 102, 131, 150, 190, 191 are AR or VR systems that may include display screens, headsets, heads-up displays, helmet-mounted display screens, or the like.

Computing device 131 corresponds to a consumer 111 of financial, regulatory, and/or communication files and/or code. Computing device 190 corresponds to the Securities and Exchange Commission's (SEC's) free online database, referred to as its Electronic Data Gathering, Analysis, and Retrieval system, otherwise known as EDGAR. Device 190 may also be a site, a collection of servers, or the like. Computing device 191 corresponds to a newswire or news aggregator. Device 191 may also be a site, a collection of servers, or the like. Computing device 150 corresponds to a publicly traded company or any company that is subject to financial regulations that require simultaneous disclosure. Device 150 may also be a site, a collection of servers or the like. Devices 102, 131, 150, 190, 191 may be communicatively coupled with network 106 in a wired or wireless fashion.

FIG. 1 further shows that server 102 includes a database or repository 104, which may be a relational database comprising a database stored in a server. Devices 131, 150, 190, 191 may also each include their own database. The repository 104 serves data from a database, which is a repository for data used by server 102 and devices 131, 150, 190, 191 during the course of operation of the disclosed embodiments. Database 104 may be distributed over one or more nodes or locations that are connected via network 106.

Database 104 may include a user record for each user 111. A user record may include contact/identifying information for the user (name, address, telephone number(s), email address, etc.), information pertaining to files associated with the user, information pertaining to the files viewed by the user etc. A user record may also include a unique identifier for each user, and the current location of each user (based on location-based services from the user's computing device).

The database 104 may include a company record for each company 150. A company record may include contact/identifying information for the company (name, address, telephone number(s), email address, website etc.), the company ticker symbol, information pertaining to files associated with the company, etc. A company record may also include a unique identifier for each company and a description of past files issued by said company.

Database 104 may include a record for each file. A file comprises a collection of data that is stored in electronic form in a particular format on a storage device, primarily identified by its filename. In one embodiment, database 104 is used to hold SEC filing documents or files, among other types of files. Examples of documents or files referred to as SEC filings are a registration statement, form 10-K, form 10-Q, form 8-K, proxy statement, forms 3, 4, and 5, schedule 13D, form 144, and foreign investment disclosures.

A registration statement provides information about the securities being offered by a company as well as its financial condition. A Form 10-K is an annual report that provides a comprehensive analysis of the company's financial condition. A Form 10-Q is a truncated version of a Form 10-K that is filed quarterly. The form provides a view of the company's ongoing financial condition throughout the year. A Form 8-K is what a company uses to disclose major developments that occur between filings of the Form 10-K or form 10-Q. Major company events that would necessitate the filing of a Form 8-K include bankruptcies or receiverships, material impairments, completion of acquisition or disposition of assets, or departures or appointments of executives. A proxy statement discloses the salaries of the management of a company and any other perks that a company's management is eligible for. The proxy statement is presented prior to the shareholder meeting and must be filed with the SEC before soliciting a shareholder vote on the election of directors and approval of other corporate actions. Forms 3, 4, and 5 disclose ownership amounts of company directors and officers, changes in ownership, and an annual summary. Schedule 13D is a beneficial ownership report and is required when any owner acquires 5% or more of the voting shares in a company. Form 144 is required when corporate insiders want to dispose of company stock. Form 144 is a notice of the intent to sell restricted stock, typically acquired by insiders or affiliates in a transaction not involving a public offering. Foreign investment disclosures apply to foreign companies offering securities in the U.S. market.

Note that although this application describes SEC filing documents and other financial documents or files, the claimed embodiments support the same processes for any financial, regulatory or communications documents or files. FIG. 1 shows an embodiment wherein networked computing devices 131, 150, 190, 191 interact with server 102 and repository 104 over the network 106. It should be noted that although FIG. 1 shows only the networked computers 131, 150, 190, 191, the system of the disclosed embodiments supports any number of networked computing devices connected via network 106. Further, server 102 and units 131, 150, 190, 191 include program logic such as computer programs, mobile applications, executable files or computer instructions (including computer source code, scripting language code, or interpreted language code that may be compiled to produce an executable file or that may be interpreted at run-time) that perform various functions of the disclosed embodiments.

Note that although server 102 is shown as a single and independent entity, in one embodiment, the functions of server 102 may be integrated with another entity, such as one of the devices 131, 150, 190, 191. Further, server 102 and its functionality, according to a preferred embodiment, can be realized in a centralized fashion in one computer system or in a distributed fashion wherein different elements are spread across several interconnected computer systems. Note also that although this document describes EDGAR 190 as the entity to which files are uploaded and from which files are downloaded, in one embodiment, said files may be uploaded to, or downloaded from, any entity, including any regulatory agency, any newswire or any information aggregator.

Figure 2:
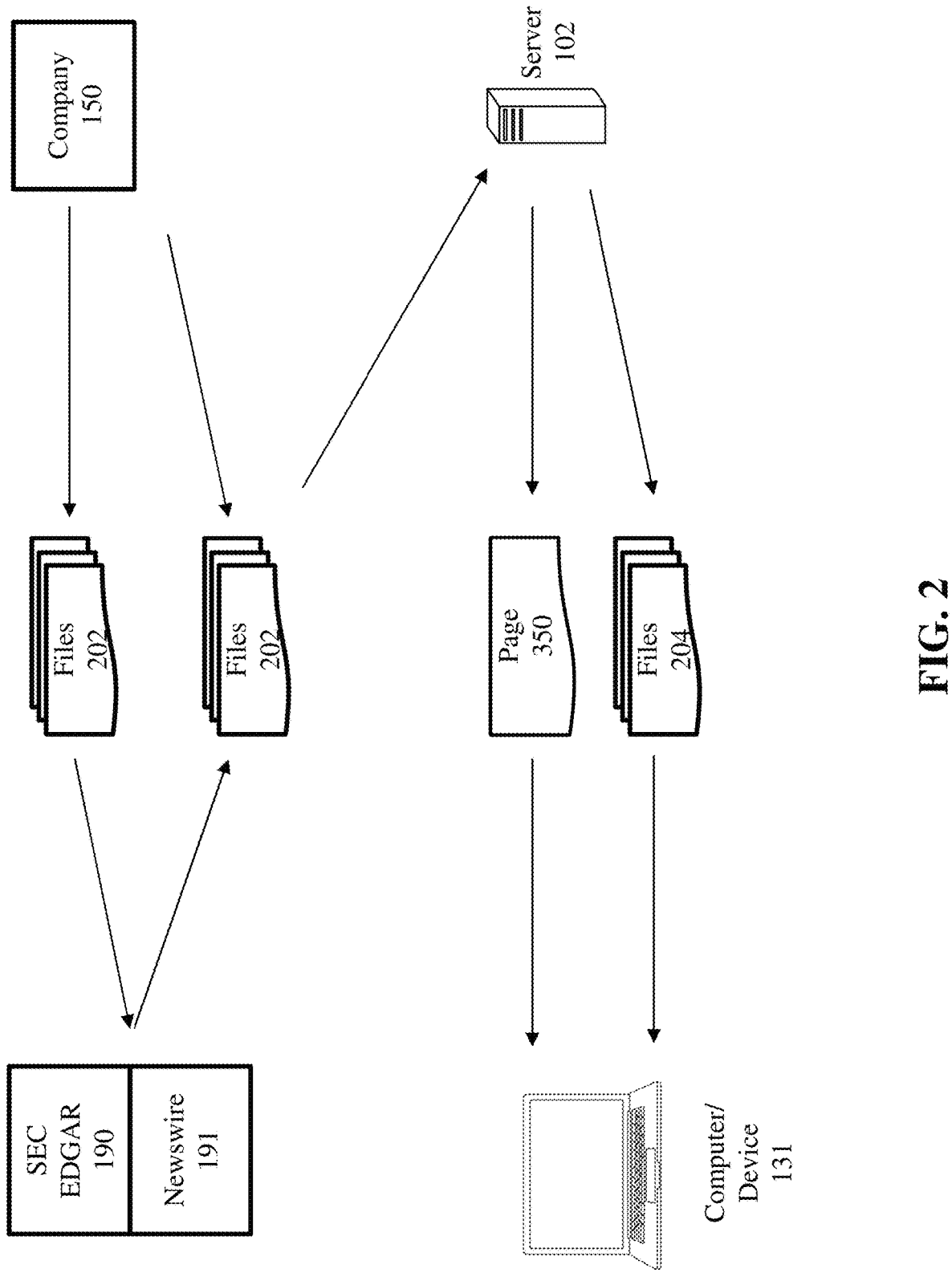
FIG. 2 is a block diagram showing the data flow of the process for remediating inaccessible files, according to one embodiment.

The process of facilitating the remediation of inaccessible files will now be described with reference to FIGS. 2-3D below. FIGS. 2-3D depict the data flow and control flow of the process for remediating inaccessible files, according to one embodiment.

In step 304, a plurality of files 202 that are inaccessible are generated and made available to server 102, such as via network 106. Said plurality of files may have been generated by company 150 and may include SEC filings, press releases, company disclosures, etc. Said files 202 may be uploaded to SEC EDGAR 190 and/or newswire/new aggregator 191, which may publish them such that they are available via network 106.

In step 308, server 102 reads the files 202, which may include downloading said files from 150, 190, 191 or any combination thereof, or obtaining the files via a feed. A feed is a data format used for providing frequently updated content, allowing users to subscribe to a channel. Next, in step 316, server 102 processes the files 202 and remediates the same, thereby generating accessible files 204 that were generated based on the inaccessible files 202. This process is described below in greater detail below. That is, embedded in step 316 is the execution of steps for detecting inaccessible code/content in one or more of its files 202, and for creating accessible files 204 corresponding to said inaccessible files, as described more fully below. For brevity, going forward, the accessible documents or files generated in step 316 shall be referred to as files 204 or accessible files 204.

In step 318, server 102 transmits the accessible files 204 to another entity such as 150, 190, 191. In step 320, the recipient of the accessible files 204 publishes the files for the consuming public via network 106. The files 204 may be published by providing a link on a company website that references the location (via a URL) of the files 204. In another embodiment, the files 204 may be published by uploading the full files on the company 105 website such that they are directly downloadable from said company website. The publishing entity may be server 102, company 150, or another entity acting on behalf of company 150, such as a website hosting entity or a third-party content management system. In one embodiment, the process of publishing any information on the web site of company 150 encompasses the acts of logging on to a website hosting server (which may be operated by a third-party hosting entity) using credentials provided by the company and uploading relevant information (such as web pages, code and other software) to said web site hosting server.

In one embodiment, in step 320, the publishing entity may generate a web page 350 (see FIG. 3C) that provides a series of links or graphic icons for viewing the files 204, according to the data structure described below. In said page 350, each link or icon is configured for viewing a particular accessible file 204. In one embodiment, a link is a URL that is clickable and readable in the viewing area of the file when said file is viewed using a document viewer, such as a word processor or a portable document format viewer. In one embodiment, step 320 operates as follows. The publishing entity iterates through the plurality of files 204, and for each particular file, it writes a link to said particular file 204 in web page 350 (such as links 352, 358, 362, 364). In step 322, consumer 111 utilizes his computing device 131 to access web page 350, including files 204.

Note that in one embodiment, the publication process of step 320 happens almost instantaneously upon SEC EDGAR 190 and/or newswire 191 publishing the files 202, thereby making step 320 occur in real time. Real-time describes operations in computing or related processes that guarantee occurrences within a specified time, usually a relatively short time. In this case, the real-time process of step 320 happens so quickly (in relation to publishing by 190, 191), that in time scales detectable by humans, step 320 effectively occurs at the same time. This is because step 320 happens so quickly (in relation to publishing by 190, 191), that a person would perceive step 320 as occurring at the same time. This is advantageous because regulations require that inaccessible files 202 (published by 190, 191) are published at the same time as the accessible files 204 (published in step 320) so as not to give the non-disabled investor an advantage over the disabled investor or investor using assistive technology. Additionally, it is important to note that the inaccessible files 202 and corresponding accessible files 204 are published at the same time in step 320. Again, this is advantageous due to regulations that require simultaneous disclosure. In one embodiment, a tolerable limit for the time frame between the publication of documents by 190, 191 and the publication of documents in step 320 is from about 6 to about 20 milliseconds.

Figure 3A:
FIG. 3A is a flow chart depicting the general control flow of a process for remediating inaccessible files, according to one embodiment.
Figure 3A:
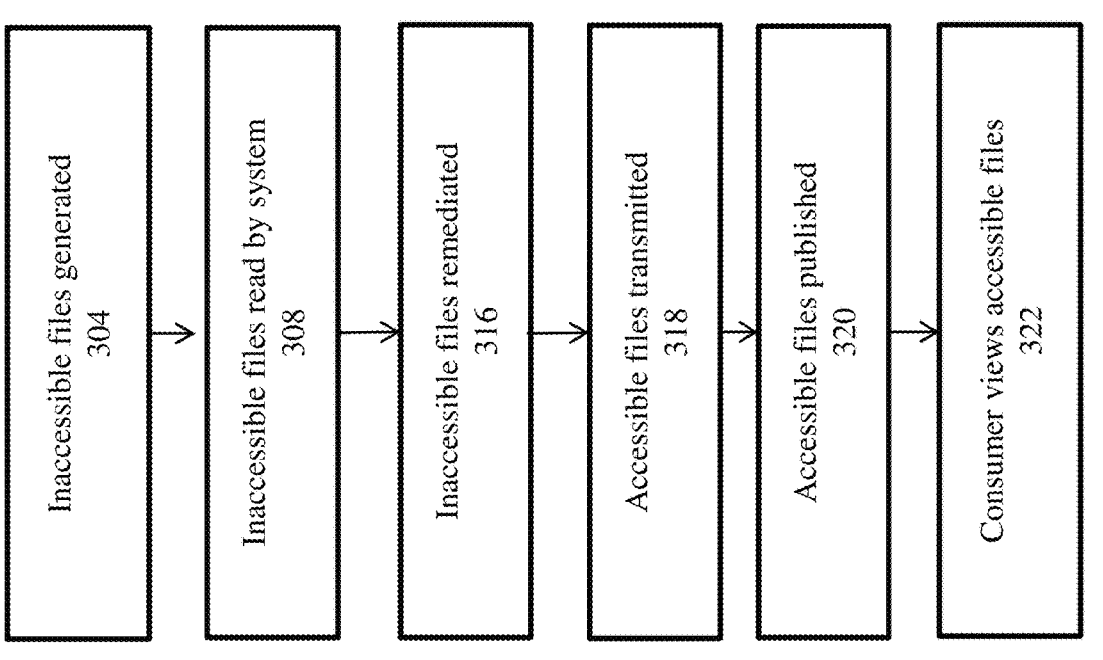
Figure 3B:
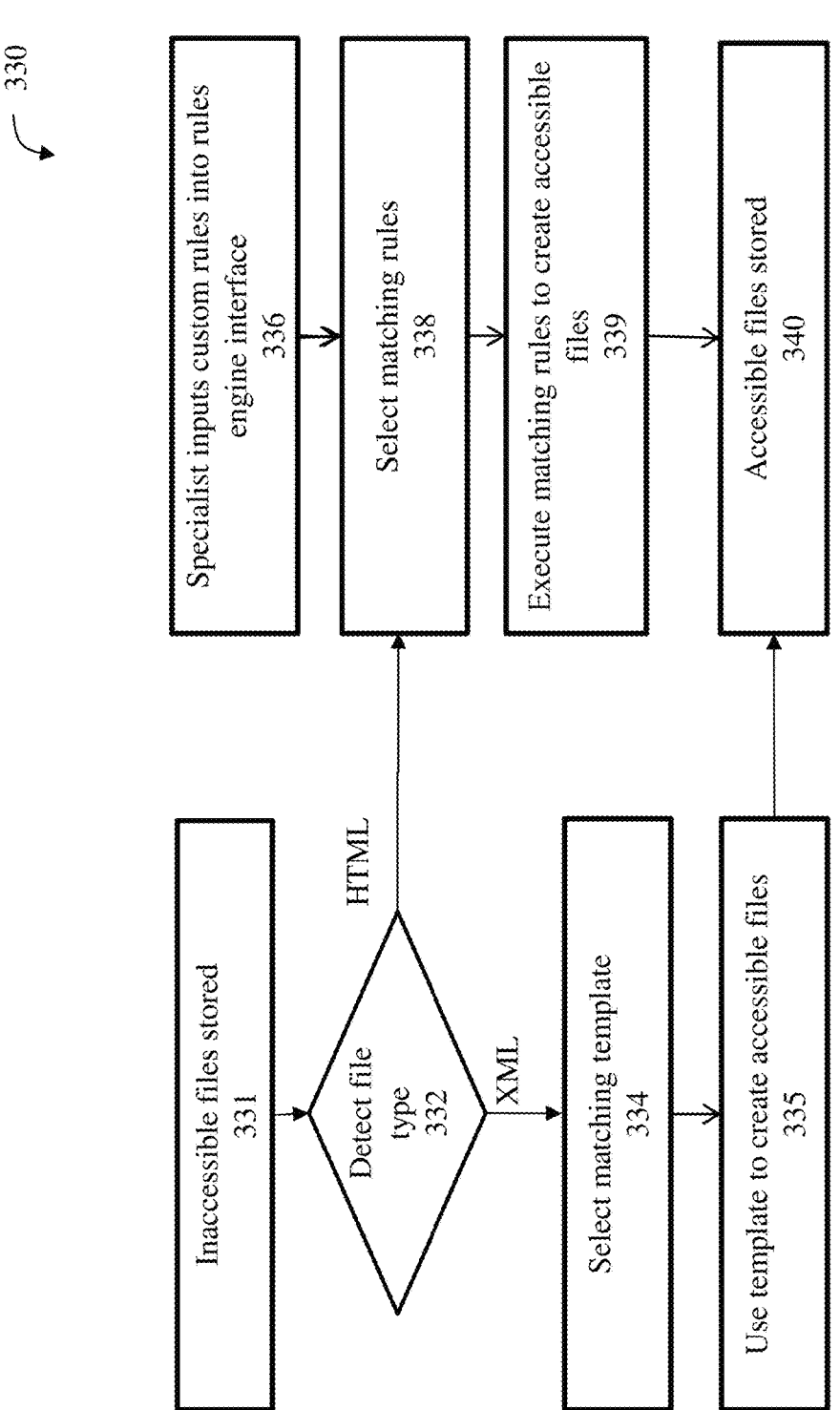
FIG. 3B is a flow chart depicting the general control flow of the remediation portion of the process for remediating inaccessible files, according to one embodiment.
Figure 3C:
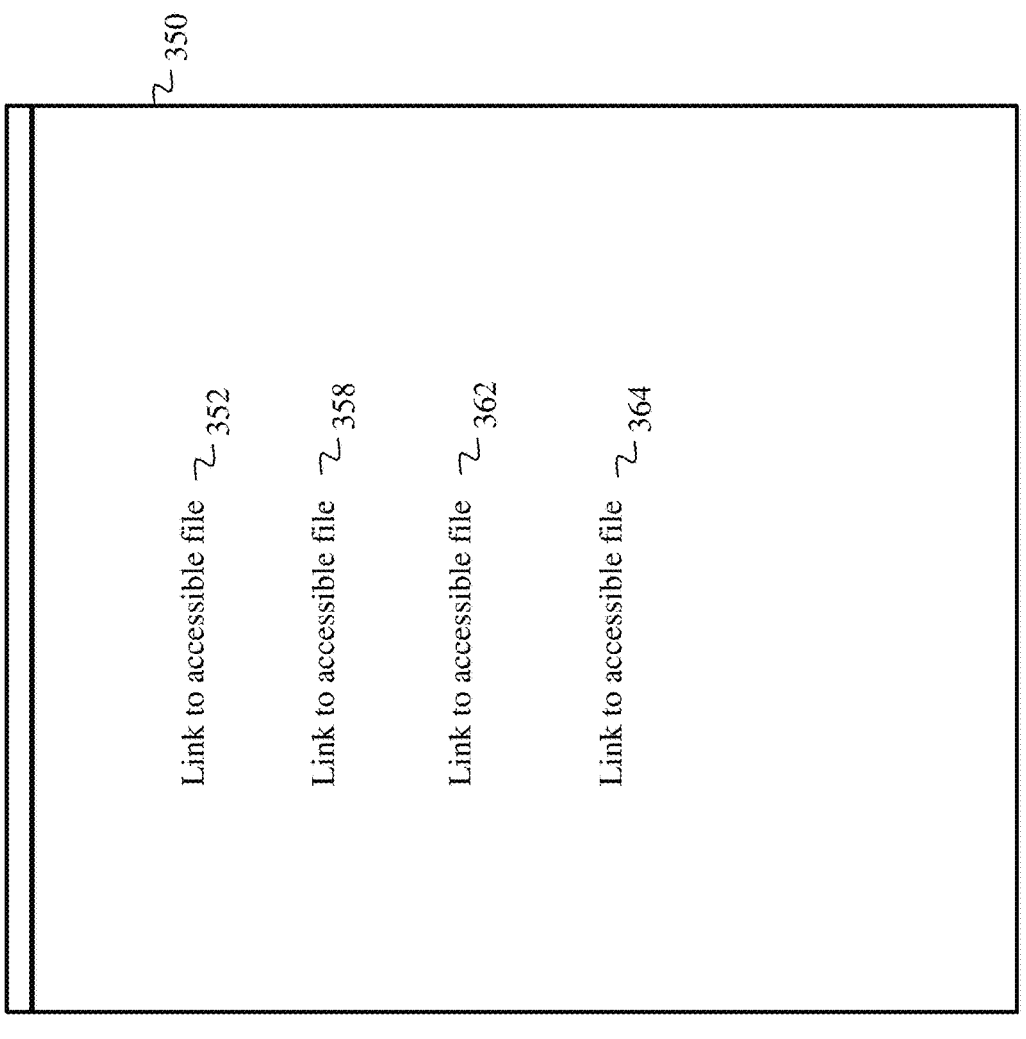
FIG. 3C is a block diagram showing a web page generated during the process for remediating inaccessible files, according to one embodiment.
Figure 3D:
FIG. 3D is a flow chart depicting the control flow of a subsequent process executed after the process for remediating inaccessible files, according to one embodiment.
Figure 3D:
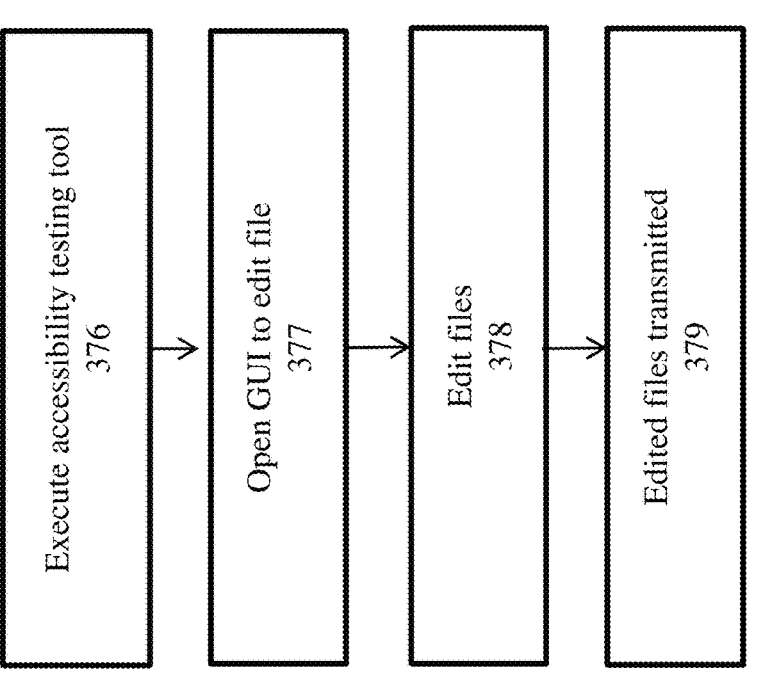

FIG. 3B is a flow chart 330 depicting more detail on the remediation portion of the process for remediating files, according to one embodiment. The steps of flow chart 330 are performed by server 102.

The process of flowchart 330 beings with step 331 wherein the files 202 are stored. Then, the process proceeds with iterating through the files 202, and performing the steps of flowchart 330 for each file. In step 332, the server 102 determines whether the first (or next file) is an XML-based file. If so, then control flows to step 333. Otherwise, if the file is an HTML file, then control flows to step 337. An XML based file is an Extensible Markup Language (XML) file, presented in a markup language and file format for storing, transmitting, and reconstructing arbitrary data. XML defines a set of rules for encoding documents in a format that is both human-readable and machine-readable. Although the design of XML focuses on documents, the language is widely used for the representation of arbitrary data structures such as those used in web services. XML has come into common use for the interchange of data over the Internet.

In step 332, the metadata of the file is read. File metadata are information that describe or relate to a file, such as its name, size, type, date, author, location, and tags. File metadata can be embedded within the file itself, or stored externally by the file system, such as in a folder or a cloud service. Specifically, the metadata of the file is read to determine document type. A document type is a standard way that information is encoded for storage in a computer file. It specifies how bits are used to encode information in a digital storage medium. Based on the document type defined in the metadata, control flows either to step 334 (if the file type is XML) or to step 338 (if the file type is HTML).

In step 334, a predefined accessible template (from a pool of predefined accessible templates) is selected that matches the metadata read above. A predefined accessible template refers to a file that is intended as a starting point from which to create other files. The predefined accessible template used is an accessible XML file template that, when populated, is accessible. In step 335, accessible data is garnered from the inaccessible file or portions of the file that were detected as being inaccessible, and said data is used to populate the selected predefined accessible template, which then becomes an accessible file ready for publication.

In step 335, server 102 creates an accessible file (which is a member of the group of accessible files 204) that corresponds to the inaccessible file that was processed. For each image, picture, clip art, chart, table, shape, embedded object, inked entry, signature, video, or audio file that was not accessible, the file is remediated by the server by adding alt text, closed captions, transcripts and correcting tagging, thereby creating a corresponding accessible file. Specifically, for all inaccessible code/content identified in the file, said inaccessible code/content is remediated, thereby creating a corresponding accessible file. An accessible file may include document properties that cater to the disabled or those using assistive technology, alternative text corresponding to visual content, styles that cater to the disabled or those using assistive technology, easily readable column headers and row headers in charts and tables, proper spacing between lines or paragraphs, closed captions for audio files, and accessibility disclaimers throughout the document. That is, an accessible file is a file that is able to be read, used and/or understood by a disabled person or a person using assistive technology. An accessible file that corresponds to the inaccessible file may comprise alt text that has been added to the file.

Prior to step 338, in step 336, a specialist enters rules into a rules engine interface on server 102. Said user interface allows the specialist to enter rules, such as if-then rules into the rules engine, which is a program that executes rules against data that is input (in this case, the inaccessible file). The rules describe how actions are applied and how an inaccessible file (or a portion thereof) may be changed. A rule may include what constitutes in accessible content, how content must be changed to be accessible, how data must be modified, etc. A rule may be expressed as an if-then statement that defines a condition precedent and a command, a statement, or other action that is executed if the condition is precedent. The condition may be one or more attributes or facts (such as the presence of an image that is not legible, the presence of data that is not accessible, etc.) that is evaluated against another set of attributes or acts (such as the data in an inaccessible file).

In one embodiment, the condition precedent may be a regular expression. A regular expression, sometimes referred to as a rational expression, is a sequence of characters that specifies a match pattern in text. Such patterns are used as a string-searching algorithm for "find" operations on text strings, or for input validation. In one embodiment, the condition precedent may be a portion of code, such as JavaScript code. Said portion of code specifies a match pattern in text that is used as a string-searching algorithm for a "find" operation on text strings.

Next, in step 338, rules (from a pool of predefined rules) are selected that match the metadata read above. In step 339, the rules engine on server 102 and/or company 150 executes the selected rules on the accessible file or inaccessible portions thereof, and thereby creates an accessible file that corresponds to the inaccessible file. Specifically, in step 339, the rules engine executes the selected set of if-then statements (input by the specialist) against code and/or data in the HTML-based inaccessible file. The execution of said rules results in the code and/or data of said inaccessible file to be remediated, thereby producing an accessible file. In step 340, said accessible file is stored. This concludes flowchart 330.

In one optional step before remediation of a file occurs, server 102 processes or scans a file to identify inaccessible portions thereof, including code or content. For example, server 102 may identify, within a file certain code or content (such as images, pictures, clip art, charts, tables, shapes, infographics, embedded objects, inked entries, signatures, video, or audio files, etc.) that is not accessible to persons using assistive technology. In one embodiment, a file may be deemed as containing code or content not accessible to persons using assistive technology because it lacks alternative text or alt text. Alt text is the written copy that appears in place of an image on a webpage if the image fails to load on a user's screen. Alt text helps screen-reading and assistive technology tools describe images to people using assistive technology. The server 102 may also scan the file for image scans of code, written content or content including text.

In another embodiment, server 102 may detect that a file does not have a language (such as English or Spanish) specified, and/or that a title for the file is not specified. This causes a problem because a screen-reader and assistive technology requires that a file specifies both a language, as well as a title for a file in order for the screen reader and assistive technology to operate properly. A screen reader and assistive technology is a technology that helps people who use assistive technology to access and interact with digital content, like websites or documents. The main users of screen readers and assistive technology are people who are blind, have very limited vision, or other disabilities. If a screen reader or assistive technology cannot work properly, the file is not accessible to people with sight disorders or other disabilities.

FIG. 3D is a flow chart 375 depicting the control flow of a subsequent process executed after the process for remediating inaccessible files, according to one embodiment. Flowchart 375 begins after step 322 of FIG. 3A. In a first step 376, an accessibility testing tool is executed on the plurality of accessible files 204 to identify any additional inaccessible code or content in said files. Said automated tool evaluates a file's code and content, determines whether the file meets accessibility guidelines, flags accessibility issues, and provides guidance on how to fix the issues, so as to help make the file more accessible to individuals with disabilities.

In step 377, a graphical user interface of the accessibility testing tool is opened, wherein said tool identifies additional inaccessible code or content in the plurality of accessible files 204 and displays said additional inaccessible code or content for the user to peruse. Said graphical user interface is configured to receive editing commands from the user that edit the additional inaccessible code or content so as to create accessible code or content. Said editing commands may be issued by interacting with the graphical user interface, such as entering written commands, pressing buttons or electing interface widgets. Said graphical user interface is also configured to receive a new rule from the user that defines how to edit the additional inaccessible code or content so as to create accessible code or content and add said new rule to the plurality of rules available during steps 338, 339.

Next, in step 378, the editing commands issued by the user, or the new rule entered by the user in the step above, are effectuated or executed so as to amend the additional inaccessible code or content in plurality of accessible files 204. Finally, in step 379, the edited files are transmitted via network 106 for publication, as in step 318 above.

Figure 4:
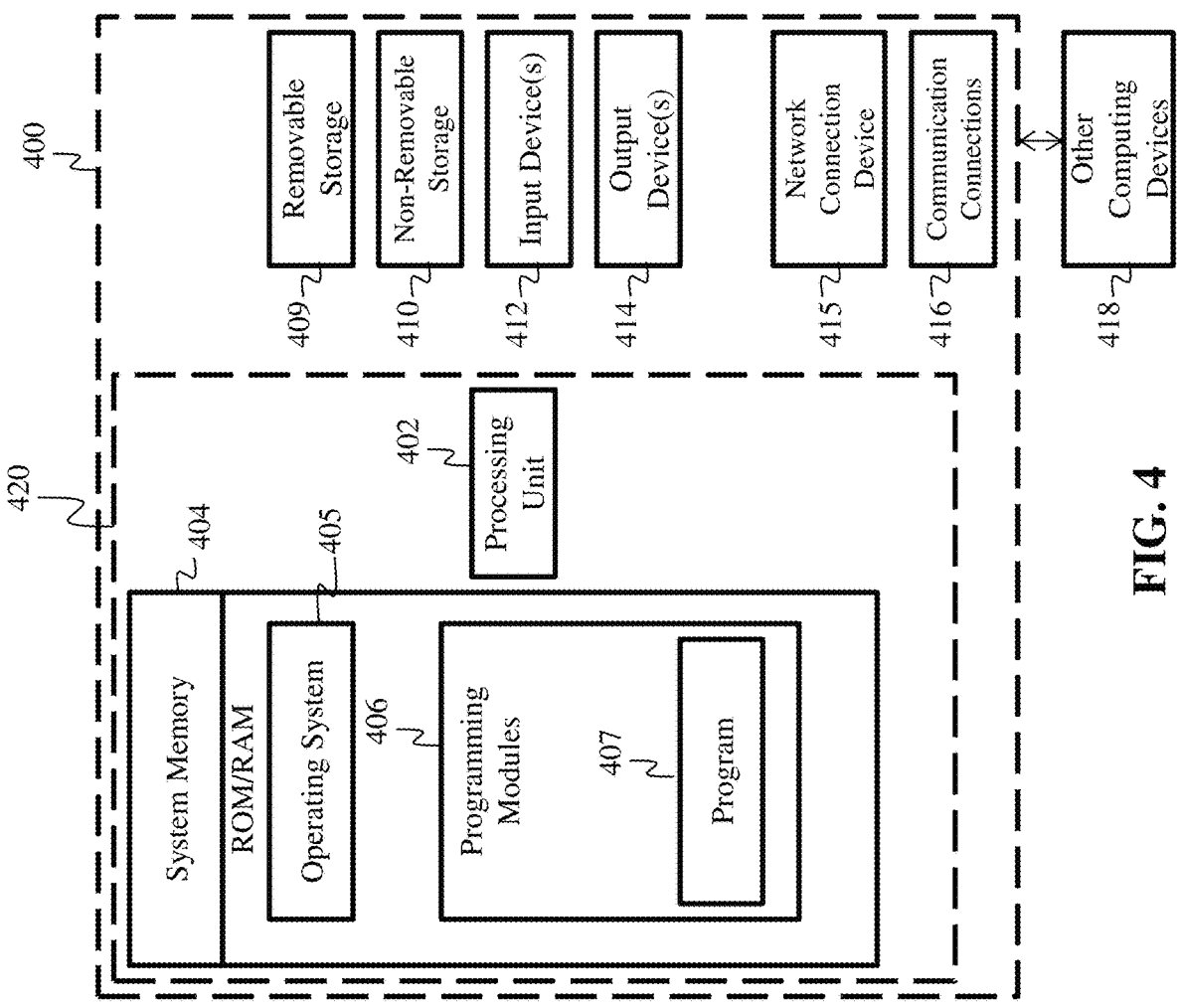
FIG. 4 is a block diagram depicting a system including an example computing device and other computing devices.

FIG. 4 is a block diagram of a system including an example computing device 400 and other computing devices. Consistent with the embodiments described herein, the aforementioned actions performed by 102, 131, 150, 190, 191 may be implemented in a computing device, such as the computing device 400 of FIG. 4. Any suitable combination of hardware, software, or firmware may be used to implement the computing device 400. The aforementioned system, device, and processors are examples and other systems, devices, and processors may comprise the aforementioned computing device. Furthermore, computing device 400 may comprise an operating environment for the devices of system 100 and processes 300, 330, 375 as described above. Processes 300, 330, 375 may operate in other environments and are not limited to computing device 400.

With reference to FIG. 4, a system consistent with an embodiment may include a plurality of computing devices, such as computing device 400. In a basic configuration, computing device 400 may include at least one processing unit 402 and a system memory 404. Depending on the configuration and type of computing device, system memory 404 may comprise, but is not limited to, volatile (e.g., random-access memory (RAM)), non-volatile (e.g., read-only memory (ROM)), flash memory, or any combination or memory. System memory 404 may include operating system 405, and one or more programming modules 406. Operating system 405, for example, may be suitable for controlling computing device 400's operation. In one embodiment, programming modules 406 may include, for example, a program module 407 for executing the actions of 102, 131, 150, 190, 191. Furthermore, embodiments may be practiced in conjunction with a graphics library, other operating systems, or any other application program and is not limited to any particular application or system. This basic configuration is illustrated in FIG. 4 by those components within a dashed line 420.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer-readable instructions, data structures, program modules, or other data. System memory 404, removable storage 409, and non-removable storage 410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a camera, a touch input device, etc. Output device(s) 414 such as a display, speakers, a printer, etc. may also be included. Computing device 400 may also include a vibration device capable of initiating a vibration in the device on command, such as a mechanical vibrator or a vibrating alert motor. The aforementioned devices are only examples, and other devices may be added or substituted.

Computing device 400 may also contain a network connection device 415 that may allow device 400 to communicate with other computing devices 418, such as over a network in a distributed computing environment, for example, an intranet or the Internet. Device 415 may be a wired or wireless network interface controller, a network interface card, a network interface device, a network adapter or a LAN adapter. Device 415 allows for a communication connection 416 for communicating with other computing devices 418. Communication connection 416 is one example of communication media. Communication media may typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both computer storage media and communication media.

As stated above, a number of program modules and data files may be stored in system memory 404, including operating system 405. While executing on processing unit 402, programming modules 406 (e.g., program module 407) may perform processes including, for example, one or more of the stages of processes 300, 330, 375 as described above. The aforementioned processes are examples, and processing unit 402 may perform other processes. Other programming modules that may be used in accordance with embodiments herein may include electronic mail and contacts applications, word processing applications, spreadsheet applications, database applications, slide presentation applications, drawing or computer-aided application programs, etc.

Generally, consistent with embodiments herein, program modules may include routines, programs, components, data structures, and other types of structures that may perform particular tasks or that may implement particular abstract data types. Moreover, embodiments herein may be practiced with other computer system configurations, including handheld devices, multiprocessor systems, microprocessor-based or programmable consumer electronics, minicomputers, mainframe computers, and the like. Embodiments herein may also be practiced in distributed computing environments where tasks are performed by remote processing devices that are linked through a communications network. In a distributed computing environment, program modules may be located in both local and remote memory storage devices.

Furthermore, embodiments herein may be practiced in an electrical circuit comprising discrete electronic elements, packaged, or integrated electronic chips containing logic gates, a circuit utilizing a microprocessor, or on a single chip (such as a System on Chip) containing electronic elements or microprocessors. Embodiments herein may also be practiced using other technologies capable of performing logical operations such as, for example, AND, OR, and NOT, including but not limited to mechanical, optical, fluidic, and quantum technologies. In addition, embodiments herein may be practiced within a general-purpose computer or in any other circuits or systems.

Embodiments herein, for example, are described above with reference to block diagrams and/or operational illustrations of methods, systems, and computer program products according to said embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments herein have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for remediating inaccessible files, the system comprising:

a computing device communicably connected to a communications network, the computing device configured for:

receiving from an entity a plurality of files associated with a particular document type for a particular company;

identifying and selecting a set of XML-based files within the plurality of files, wherein said set of XML-based files includes inaccessible code or content that is not accessible to persons with disabilities that use assistive technologies;

reading metadata of the set of XML-based files and identifying a document type in said metadata;

selecting a matching XML template from a plurality of XML templates, said matching XML template defining accessibility-compliant structural placeholders for assistive-technology interpretation, and wherein said matching XML template corresponds to the document type;

for each file of the set of XML-based files, merging substantive data extracted into placeholders of the matching XML template, so as to generate and store a plurality of accessible files constructed from a combination of the set of XML-based files and the particular XML template;

transmitting the plurality of accessible files over the communications network to another computing device for publication; and executing an accessibility testing tool on the plurality of accessible files to identify any additional inaccessible code or content in the plurality of accessible files.

2. The system of claim 1, wherein said entity is a regulatory agency, a newswire, or an information aggregator.

3. A system for remediating inaccessible files, the system comprising:

a computing device communicably connected to a communications network, the computing device configured for:

receiving from an entity a plurality of files associated with a particular document type for a particular company;

identifying and selecting a set of HTML-based files within the plurality of files, wherein said set of HTML-based files includes inaccessible code or content that is not accessible to persons with disabilities that use assistive technologies;

reading metadata of the set of HTML-based files and identifying a document type in said metadata;

selecting a matching set of rules from a plurality of rules, wherein said matching set of rules corresponds to the document type, and wherein a rule comprises an if-portion that defines a machine-readable accessibility condition corresponding to inaccessible code or content that prevents interpretation by assistive technology and a then-portion that defines an accessibility transformation configured to modify HTML content to produce accessible code or content;

executing the matching set of rules against the set of HTML-based files, wherein the condition of the if-portion of each rule is evaluated against each HTML element of the set of HTML-based fields, and wherein if said condition is met, the transformation defined in the then-portion of said rules is executed upon said HTML element;

generating and storing a plurality of accessible files based on the set of HTML-based files upon which the matching set of rules were executed; and transmitting the plurality of accessible files over the communications network to another computing device for publication.

4. The system of claim 3, wherein said entity is a regulatory agency, a newswire, or an information aggregator.

5. The system of claim 4, wherein a condition is a regular expression.

6. The system of claim 5, wherein a condition is a portion of source code.

7. A system for remediating inaccessible files, the system comprising:

a computing device communicably connected to a communications network, the computing device configured for:

receiving from an entity a plurality of files associated with a particular document type for a particular company;

identifying and selecting a set of HTML-based files within the plurality of files, wherein said set of HTML-based files includes inaccessible code or content that is not accessible to persons with disabilities that use assistive technologies;

reading metadata of the set of HTML-based files and identifying a document type in said metadata;

selecting a matching set of rules from a plurality of rules, wherein said matching set of rules corresponds to the document type, and wherein a rule comprises an if-portion that defines a machine-readable accessibility condition corresponding to inaccessible code or content that prevents interpretation by assistive technology and a then-portion that defines an accessibility transformation configured to modify HTML content to produce accessible code or content;

executing the matching set of rules against the set of HTML-based files, wherein the condition of the if-portion of each rule is evaluated against each HTML element of the set of HTML-based fields, and wherein if said condition is met, the transformation defined in the then-portion of said rules is executed upon said HTML element;

generating and storing a plurality of accessible files based on the set of HTML-based files upon which the matching set of rules were executed;

transmitting the plurality of accessible files over the communications network to another computing device for publication;

executing an accessibility testing tool on the plurality of accessible files to identify any additional inaccessible code or content in the plurality of accessible files;

opening a graphical user interface that displays the additional inaccessible code or content in the plurality of accessible files and either: 1) receiving editing commands from a user that edit the additional inaccessible code or content so as to create accessible code or content, or 2) receiving a new rule from the user that defines how to edit the additional inaccessible code or content so as to create accessible code or content, and adding said new rule to the plurality of rules;

effectuating the editing commands or the new rule so as to amend the additional inaccessible code or content in plurality of accessible files; and transmitting the plurality of accessible files over the communications network to another computing device for publication.

8. The system of claim 1, wherein the computing device is further configured for:

reading a plurality of original XML templates;

editing inaccessible code or content in the plurality of original XML templates so as to generate the plurality of XML templates comprising accessible code or content.

9. The system of claim 8, wherein said entity is a regulatory agency, a newswire, or an information aggregator.

10. The system of claim 9, wherein a condition is a regular expression.

11. The system of claim 10, wherein a condition is a portion of source code.

* * * * *